(12) United States Patent
Fujita

(10) Patent No.: US 10,795,155 B2
(45) Date of Patent: Oct. 6, 2020

(54) PROJECTION DISPLAY DEVICE AND CONTROL METHOD FOR THE SAME

(71) Applicant: FUJIFILM Corporation, Tokyo (JP)

(72) Inventor: Koudai Fujita, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/283,846

(22) Filed: Feb. 25, 2019

(65) Prior Publication Data

US 2019/0187467 A1 Jun. 20, 2019

Related U.S. Application Data

(63) Continuation of application No. PCT/JP2017/029805, filed on Aug. 21, 2017.

(30) Foreign Application Priority Data

Sep. 16, 2016 (JP) .................................. 2016-181515

(51) Int. Cl.
*G02B 27/01* (2006.01)
*B60K 35/00* (2006.01)
(Continued)

(52) U.S. Cl.
CPC .......... *G02B 27/0101* (2013.01); *B60K 35/00* (2013.01); *G02B 27/01* (2013.01);
(Continued)

(58) Field of Classification Search
None
See application file for complete search history.

(56) References Cited

U.S. PATENT DOCUMENTS 5,596,319 A * 1/1997 Spry .................... G05D 1/0276
340/903
6,476,794 B1 11/2002 Kataoka et al.
(Continued)

FOREIGN PATENT DOCUMENTS

JP          110214543      8/1998
JP          2000006687     1/2000
(Continued)

OTHER PUBLICATIONS

"International Search Report (Form PCT/ISA/210) of PCT/JP2017/029805," dated Oct. 10, 2017, with English translation thereof, pp. 1-4.
(Continued)

*Primary Examiner* — Jason A Pringle-Parker
(74) *Attorney, Agent, or Firm* — JCIPRNET

(57) ABSTRACT

A projection display device includes an image data control unit that controls image data to be input to a light modulation unit, and a situation determination unit that determines, in a state where an automated driving mode is set, whether or not a situation has occurred where an operation device mounted in a vehicle and used for driving needs to be operated. When it is determined that the situation has occurred where the operation device needs to be operated, the image data control unit inputs, to a driving unit, first image data for displaying images corresponding to a plurality of operation devices in a positional relationship corresponding to an arrangement of the plurality of operation devices and displaying, in an emphasized manner, the image corresponding to the operation device that needs to be operated, and displays an operation assisting image that is based on the first image data.

10 Claims, 8 Drawing Sheets

(51) Int. Cl.
*G03B 21/14* (2006.01)
*G09G 3/00* (2006.01)
*G09G 3/02* (2006.01)
*G02B 27/14* (2006.01)

(52) U.S. Cl.
CPC .............. *G03B 21/14* (2013.01); *G09G 3/002* (2013.01); *G09G 3/02* (2013.01); *B60K 2370/188* (2019.05); *B60K 2370/334* (2019.05); *B60K 2370/52* (2019.05); *G02B 27/149* (2013.01); *G02B 2027/014* (2013.01); *G02B 2027/0114* (2013.01); *G02B 2027/0141* (2013.01); *G09G 2380/10* (2013.01)

(56) References Cited

U.S. PATENT DOCUMENTS

| | | | | |
|---|---|---|---|---|
| 9,827,907 | B2* | 11/2017 | Sugita | B60K 35/00 |
| 10,269,260 | B2* | 4/2019 | Ellis | G09B 9/04 |
| 2006/0259210 | A1 | 11/2006 | Tanaka et al. | |
| 2007/0198145 | A1* | 8/2007 | Norris | B60T 7/22 |
| | | | | 701/23 |
| 2011/0187518 | A1* | 8/2011 | Strumolo | B62D 1/046 |
| | | | | 340/438 |
| 2012/0083960 | A1* | 4/2012 | Zhu | G05D 1/0214 |
| | | | | 701/23 |
| 2014/0207535 | A1* | 7/2014 | Stefan | G05D 1/0022 |
| | | | | 705/7.42 |
| 2014/0220513 | A1* | 8/2014 | Harkness | G09B 9/05 |
| | | | | 434/69 |
| 2015/0199162 | A1* | 7/2015 | Platz | G08G 1/0112 |
| | | | | 701/1 |
| 2015/0346718 | A1* | 12/2015 | Stenneth | G06Q 30/0611 |
| | | | | 701/2 |
| 2016/0084661 | A1* | 3/2016 | Gautama | G01C 21/365 |
| | | | | 701/400 |
| 2017/0355265 | A1 | 12/2017 | Fujita | |

FOREIGN PATENT DOCUMENTS

| | | |
|---|---|---|
| JP | 2001199295 | 7/2001 |
| JP | 2006315562 | 11/2006 |
| JP | 2009184406 | 8/2009 |
| JP | 2015182624 | 10/2015 |
| WO | 2016143412 | 9/2016 |

OTHER PUBLICATIONS

"International Preliminary Report on Patentability (Form PCT/IPEA/409) of PCT/JP2017/029805," completed on Oct. 11, 2018, with English translation thereof, pp. 1-15.

* cited by examiner

PROJECTION DISPLAY DEVICE AND CONTROL METHOD FOR THE SAME

CROSS-REFERENCE TO RELATED APPLICATIONS

This application is a Continuation of PCT International Application No. PCT/JP2017/029805 filed on Aug. 21, 2017, which claims priority under 35 U.S.C § 119(a) to Japanese Patent Application No. 2016-181515 filed on Sep. 16, 2016. Each of the above application(s) is hereby expressly incorporated by reference, in its entirety, into the present application.

BACKGROUND OF THE INVENTION

1. Field of the Invention

The present invention relates to a projection display device and a control method for the same.

2. Description of the Related Art

A head-up display (HUD) for a vehicle has been known. In the HUD, a combiner that is disposed on a windshield of a vehicle, such as an automobile, a train, a ship, a heavy machine, an aircraft, or an agricultural machine, or that is disposed near a position before the windshield is used as a screen, and light is projected onto the screen to display an image. The HUD enables a driver to visually recognize an image that is based on light projected from the HUD as a real image on the screen or as a virtual image in front of the screen.

JP2009-184406A and JP2006-315562A describe a system that assists driving by using the HUD. The HUD described in JP2009-184406A and JP2006-315562A displays an image imitating an operation panel provided on a steering wheel of an automobile, thereby enabling a driver of the automobile to grasp the arrangement of buttons on the operation panel by viewing the image of the HUD without viewing the operation panel.

JP1998-214543A (JP-H10-214543A) describes an automobile that causes a center console to display the shapes of operation switches for operating an air conditioner, an audio device, a car navigation system, and the like, and the functions of the operation switches.

JP2000-006687A describes an automobile that causes an instrument panel to display the arrangement of multi-switches for operating an audio device or the like.

SUMMARY OF THE INVENTION

In recent years, automated driving or remote driving of vehicles has been developed toward practical use. Even in automated driving or remote driving, it is necessary for a driver to intervene in a system on his/her own will. For example, in an emergency or the like, a situation may occur where operation is left to a passenger including a driver even during automated driving or remote driving. However, during automated driving or remote driving, driving is basically being performed in an automated manner, and thus it is not easy for the passenger to instantaneously grasp which operation needs to be performed.

JP2009-184406A, JP2006-315562A, JP1998-214543A (JP-H10-214543A), and JP2000-006687A describe techniques for displaying an image for assisting an operation of equipment that is not directly related to driving, such as an audio device or an air conditioner. Thus, when a dangerous event or the like is likely to occur during automated driving or remote driving, a passenger does not know an operation to be performed to avoid the event and a delay may occur until a necessary operation related to driving is performed.

The present invention has been made in view of the above-described circumstances, and an object of the present invention is to provide a projection display device and a control method for the same that are capable of intuitively notifying a passenger of a necessary operation during automated driving or remote driving.

A projection display device of the present invention is a projection display device mounted in a vehicle, the vehicle being settable to a first mode in which driving is performed in accordance with an internally generated instruction or an externally and wirelessly received instruction, the projection display device including: a light modulation unit that spatially modulates, in accordance with image data that has been input, light emitted by a light source; a projection optical system that projects the light that has been spatially modulated onto a projection surface of the vehicle to display a virtual image or real image that is based on the image data; an image data control unit that controls image data to be input to the light modulation unit; and a situation determination unit that determines, in a state where the first mode is set, whether or not a situation has occurred where at least one operation device among a plurality of operation devices mounted in the vehicle and used for driving needs to be operated, wherein when the situation determination unit determines that the situation has occurred where the at least one operation device needs to be operated, the image data control unit inputs, to the light modulation unit, first image data for displaying images corresponding to the plurality of operation devices in a positional relationship corresponding to an arrangement of the plurality of operation devices and displaying, in an emphasized manner, the image corresponding to the at least one operation device that needs to be operated.

A control method for a projection display device of the present invention is a control method for a projection display device mounted in a vehicle and having a light modulation unit that spatially modulates, in accordance with image data that has been input, light emitted by a light source, and a projection optical system that projects the light that has been spatially modulated onto a projection surface of the vehicle to display a virtual image or real image that is based on the image data, the vehicle being settable to a first mode in which driving is performed in accordance with an internally generated instruction or an externally and wirelessly received instruction, the control method including: an image data control step of controlling image data to be input to the light modulation unit; and a situation determination step of determining, in a state where the first mode is set, whether or not a situation has occurred where at least one operation device among a plurality of operation devices mounted in the vehicle and used for driving needs to be operated, wherein when the situation determination step determines that the situation has occurred where the at least one operation device needs to be operated, the image data control step inputs, to the light modulation unit, first image data for displaying images corresponding to the plurality of operation devices in a positional relationship corresponding to an arrangement of the plurality of operation devices and displaying, in an emphasized manner, the image corresponding to the at least one operation device that needs to be operated.

According to the present invention, it is possible to provide a projection display device and a control method for the same that are capable of intuitively notifying a passenger of a necessary operation during automated driving or remote driving.

DESCRIPTION OF THE PREFERRED EMBODIMENTS

Hereinafter, an embodiment of the present invention will be described with reference to the drawings.

Figure 1:
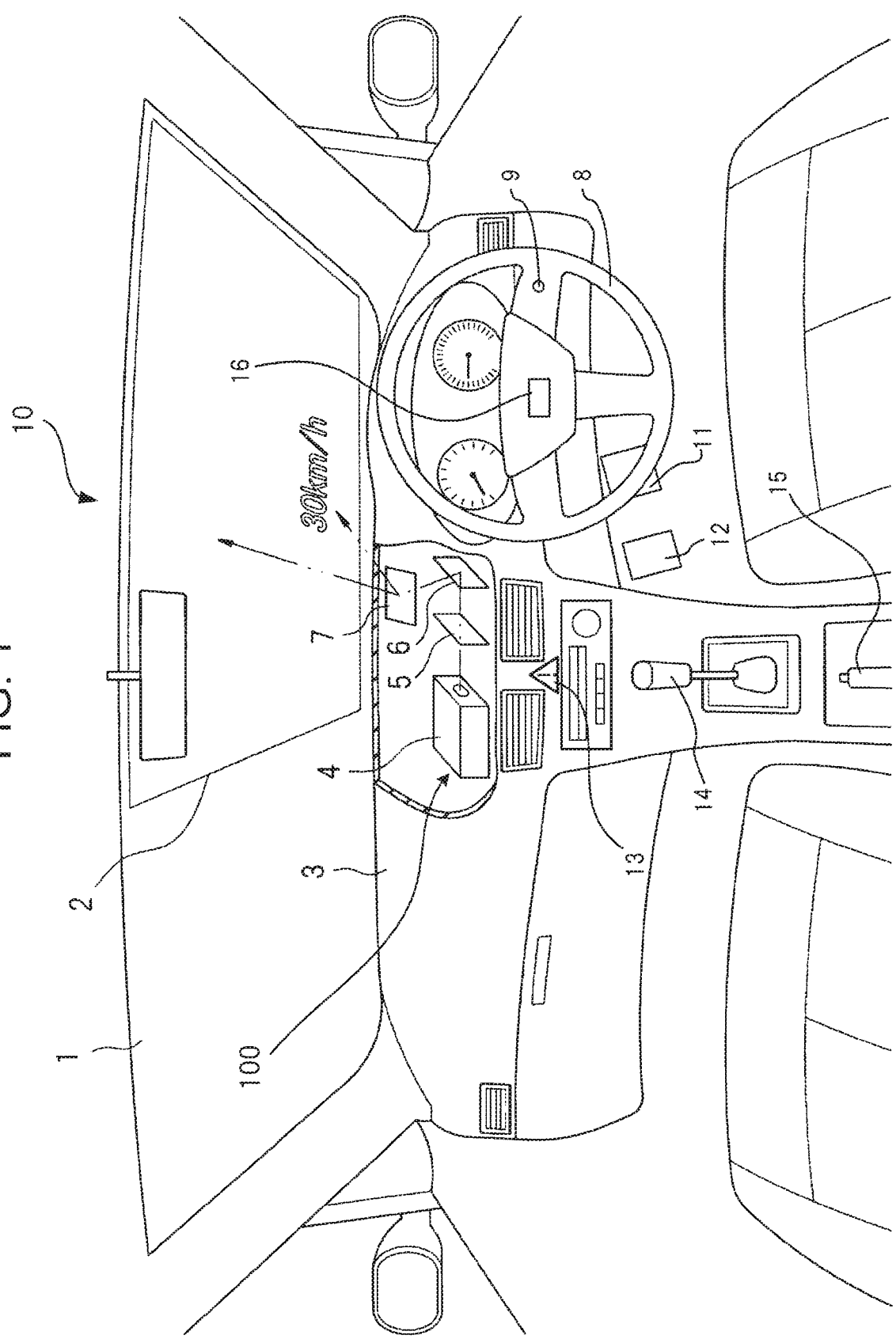
FIG. 1 is a schematic diagram illustrating an indoor configuration of an automobile 10 in which an HUD 100, which is an embodiment of a projection display device of the present invention, is mounted.

FIG. 1 is a schematic diagram illustrating an indoor configuration of an automobile 10 in which a head-up display (HUD) 100, which is an embodiment of a projection display device of the present invention, is mounted.

A part of a front windshield 1 of the automobile 10 is a region that has been processed to reflect image light, which will be described below, and this region constitutes a projection surface 2.

The HUD 100 is mounted in the automobile 10 and enables a driver of the automobile 10 to visually recognize a virtual image or real image by using image light projected onto the projection surface 2, which is a region of a part of the front windshield 1 of the automobile 10.

The HUD 100 may be used by being mounted in a vehicle, such as a train, a heavy machine, a construction machine, an aircraft, a ship, or an agricultural machine, as well as an automobile.

In the example illustrated in FIG. 1, the HUD 100 is built in a dashboard 3 of the automobile 10. The dashboard 3 is a member that contains, in its inside, built-in components including gauges for presenting information necessary for driving, such as a speedometer, a tachometer, a fuel gauge, a water temperature gauge, an odometer, or the like of the automobile 10.

The HUD 100 includes a control unit 4, a diffusion member 5, a reflection mirror 6, and a concave mirror 7. The control unit 4 includes a light source and a light modulation element that spatially modulates, in accordance with image data, light emitted by the light source. The diffusion member 5, the reflection mirror 6, and the concave mirror 7 constitute a projection optical system that projects, onto the projection surface 2 of the front windshield 1, image light that has been spatially modulated by the light modulation element of the control unit 4.

The diffusion member 5 is a member that diffuses the image light that has been spatially modulated by the light modulation element of the control unit 4, thereby making a plane light source. As the diffusion member 5, a micromirror array having a fine structure on its surface, a diffusion mirror, a microlens-array (MLA) diffuser, a reflection holographic diffuser, or the like is used.

The reflection mirror 6 reflects the image light diffused by the diffusion member 5.

The concave mirror 7 enlarges and reflects the image light reflected by the reflection mirror 6 and projects the image light onto the projection surface 2. The projection surface 2 of the front windshield 1 has been processed to reflect the image light projected from the concave mirror 7 in the direction of the eyes of the driver.

Alternatively, the HUD 100 may be disposed near the ceiling of the automobile 10, for example, and may have a configuration of projecting image light onto a combiner of a sun visor type installed near the ceiling of the automobile 10. In this configuration, the combiner constitutes a projection surface.

The driver of the automobile is able to visually recognize information, such as an icon or characters, for assisting driving, by looking at a virtual image that is based on the image light projected onto and reflected by the projection surface 2. In addition, the projection surface 2 has a function of allowing light from the outside (outside world) of the front windshield 1 to pass therethrough. Thus, the driver is able to visually recognize an image in which a virtual image that is based on the image light projected from the concave mirror 7 and an outside view are superimposed on one another.

The automobile 10 is settable to a first mode (also referred to as an automated driving mode or a remote driving mode) in which driving (operations of a direction indicator, a steering, an accelerator, a brake, and the like) is performed in accordance with an instruction internally generated by an automobile control unit that centrally controls the entire automobile and that is not illustrated or an instruction externally and wirelessly received by the automobile control unit, and a second mode (manual driving mode) in which a person drives manually.

The automobile 10 has typical operation devices mounted in an automobile, such as an accelerator pedal 11 for increasing speed, a brake pedal 12 for decreasing speed, a gearshift 14 for shifting gears, a parking brake lever 15 for putting the parking brake on, a wiper operation lever (not illustrated), a hazard button 13 for turning on a hazard lamp, and a steering wheel 8.

The steering wheel 8 of the automobile 10 is provided with a horn button 16 for honking a horn and a driving mode switch button 9. The driving mode switch button 9 is a mode switching instruction device for instructing the automobile 10 to switch the mode between the first mode and the second mode.

The accelerator pedal 11, the brake pedal 12, the gearshift 14, the parking brake lever 15, the wiper operation lever, the horn button 16, the hazard button 13, the steering wheel 8, and the driving mode switch button 9 constitute operation devices mounted in the automobile 10 and used for driving.

Figure 2:
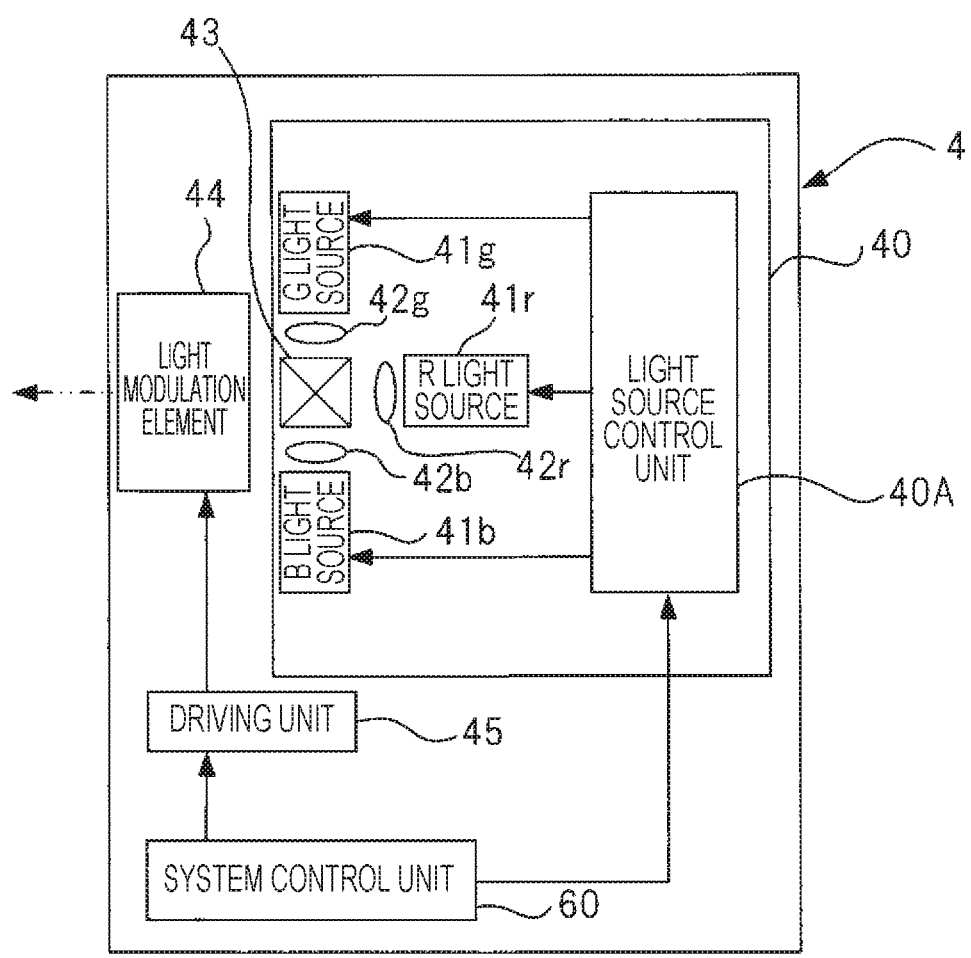
FIG. 2 is a schematic diagram illustrating an internal hardware configuration of a control unit 4 of the HUD 100 illustrated in FIG. 1.

FIG. 2 is a schematic diagram illustrating an internal hardware configuration of the control unit 4 of the HUD 100 illustrated in FIG. 1.

The control unit 4 includes a light source unit 40, a light modulation element 44, a driving unit 45 that drives the light modulation element 44, and a system control unit 60 that centrally controls the entire HUD 100.

The system control unit 60 includes a processor, a read only memory (ROM) storing a program or the like executed by the processor, and a random access memory (RAM) functioning as a work memory of the processor.

The light source unit 40 includes a light source control unit 40A, an R light source 41r serving as a red light source that emits red light, a G light source 41g serving as a green light source that emits green light, a B light source 41b serving as a blue light source that emits blue light, a dichroic prism 43, a collimator lens 42r provided between the R light source 41r and the dichroic prism 43, a collimator lens 42g provided between the G light source 41g and the dichroic prism 43, and a collimator lens 42b provided between the B light source 41b and the dichroic prism 43. The R light source 41r, the G light source 41g, and the B light source 41b constitute a light source of the HUD 100.

The dichroic prism 43 is an optical member for guiding rays of light emitted by the R light source 41r, the G light source 41g, and the B light source 41b to an identical light path. The dichroic prism 43 allows red light collimated by the the collimator lens 42r to pass therethrough and emits the red light to the light modulation element 44. In addition, the dichroic prism 43 allows green light collimated by the collimator lens 42g to be reflected thereby and emits the green light to the light modulation element 44. Furthermore, the dichroic prism 43 allows blue light collimated by the collimator lens 42b to be reflected thereby and emits the blue light to the light modulation element 44. The optical member having such a function is not limited to the dichroic prism. For example, a cross dichroic mirror may be used.

A light emitting element, such as a laser or a light emitting diode (LED), is used as each of the R light source 41r, the G light source 41g, and the B light source 41b. The light source of the HUD 100 is not limited to the three light sources, that is, the R light source 41r, the G light source 41g, and the B light source 41b, and may be constituted by one light source, two light sources, or four or more light sources.

The light source control unit 40A controls each of the R light source 41r, the G light source 41g, and the B light source 41b, and performs control to cause light to be emitted by each of the R light source 41r, the G light source 41g, and the B light source 41b.

The light modulation element 44 spatially modulates, in accordance with image data received from the system control unit 60, the rays of light emitted by the R light source 41r, the G light source 41g, and the B light source 41b and emitted from the dichroic prism 43.

As the light modulation element 44, for example, liquid crystal on silicon (LCOS), a digital micromirror device (DMD), a micro electro mechanical systems (MEMS) element, a liquid crystal display element, or the like may be used.

The driving unit 45 drives the light modulation element 44 in accordance with image data received from the system control unit 60 and causes image light that has been spatially modulated in accordance with the image data (red image light, blue image light, and green image light) to be emitted from the light modulation element 44 to the diffusion member 5. The light modulation element 44 and the driving unit 45 constitute a light modulation unit of the HUD 100.

The projection optical system constituted by the diffusion member 5, the reflection mirror 6, and the concave mirror 7 illustrated in FIG. 1 is optically designed so that an image that is based on image light projected onto the projection surface 2 can be visually recognized by the driver as a virtual image at a position in front of the front windshield 1. The projection optical system may be optically designed so that the image that is based on the image light can be visually recognized by the driver as a real image on the front windshield 1.

The system control unit 60 controls the light source control unit 40A and the driving unit 45 and causes image light that is based on image data to be emitted from the control unit 4 to the diffusion member 5.

Figure 3:
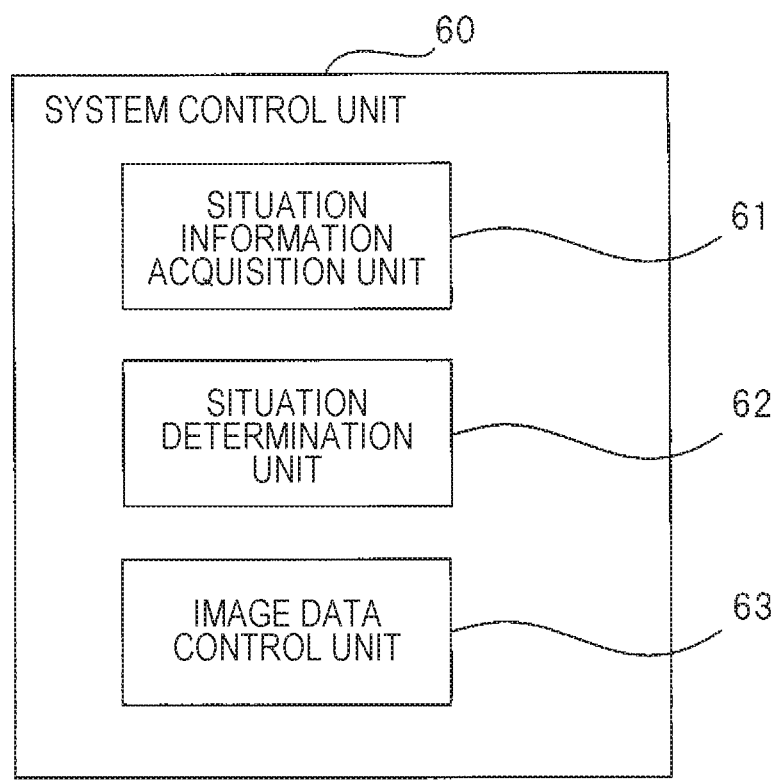
FIG. 3 is a functional block diagram of a system control unit 60 illustrated in FIG. 2.

FIG. 3 is a functional block diagram of the system control unit 60 illustrated in FIG. 2.

The system control unit 60 includes a situation information acquisition unit 61, a situation determination unit 62, and an image data control unit 63. The situation information acquisition unit 61, the situation determination unit 62, and the image data control unit 63 are configured by executing the program stored in the ROM by the processor of the system control unit 60. The program includes a control program.

The situation information acquisition unit 61 acquires, from the automobile control unit that centrally controls the entire system of the automobile 10 and that is not illustrated, situation information, such as information about operation states of the above-described operation devices, information detected by a sensor (an ultrasonic radar, a millimeter-wave radar, a laser radar, a stereo camera, or the like) mounted in the automobile 10 and not illustrated, information indicating whether or not the sensor has a failure, or captured image data of a view in front of or behind the automobile 10, the image data being acquired by capturing an image by an imaging unit that is mounted on the body of the automobile 10 and that is not illustrated.

The situation determination unit 62 determines, in a state where the automobile 10 is in the first mode, in accordance with the situation information acquired by the situation information acquisition unit 61, whether or not a situation has occurred where at least one of the above-described operation devices mounted in the automobile 10 and used for driving needs to be operated. Examples of determination performed by the situation determination unit 62 will be given below, but the determination is not limited thereto.

(1) The situation determination unit 62 analyzes information measured by the sensor mounted in the automobile 10. As a result of the analysis, when the distance between the automobile 10 and an obstacle is smaller than or equal to a threshold value, the situation determination unit 62 determines that a situation has occurred where the brake pedal 12 and the steering wheel 8 need to be operated.

(2) The situation determination unit 62 analyzes information measured by the sensor. As a result of the analysis, when an obstacle, such as a person or a vehicle, is crossing in front of the automobile 10 at long distances, the situation determination unit 62 determines that a situation has occurred where the horn button 16 needs to be operated.

(3) When the parking brake is on, the situation determination unit 62 determines that a situation has occurred where the parking brake lever 15 needs to be operated (the parking brake needs to be released).

(4) When the gearshift 14 is at a neutral position, the situation determination unit 62 determines that a situation has occurred where the gearshift 14 needs to be operated (needs to be shifted to a drive position).

(5) The situation determination unit 62 analyzes captured image data acquired from the imaging unit mounted at a front portion of the automobile 10. As a result of the analysis, when the situation determination unit 62 determines that the automobile 10 is at the end of a traffic jam, the situation determination unit 62 determines that a situation has occurred where the hazard button 13 needs to be operated.

(6) The situation determination unit 62 analyzes captured image data acquired from the imaging unit mounted at the front portion of the automobile 10. As a result of the analysis, when the situation determination unit 62 determines that snow or rain is falling, the situation determination unit 62 determines that a situation has occurred where the wiper operation lever needs to be operated.

(7) When the situation determination unit 62 detects a failure of the sensor that is necessary for driving in the first mode and determines that switching from the first mode to the second mode is necessary, the situation determination unit 62 determines that a situation has occurred where the driving mode switch button 9 needs to be operated.

(8) When switching from the first mode to the second mode is necessary, as described above, the situation determination unit 62 determines that a situation has occurred where the steering wheel 8, the accelerator pedal 11, the brake pedal 12, and the driving mode switch button 9, which are minimum needed to drive in the second mode, need to be operated.

In the foregoing examples, the situation determination unit 62 analyzes information acquired by the situation information acquisition unit 61 and determines whether or not a specific operation device needs to be operated. However, the automobile control unit that centrally controls the automobile 10 may perform the analysis. In this case, when the automobile control unit determines, as a result of the analysis, that a specific operation device needs to be operated, the automobile control unit inputs information on the operation device to the system control unit 60 of the HUD 100. Subsequently, the situation information acquisition unit 61 acquires the information on the operation device received from the automobile control unit, and the situation determination unit 62 determines, in accordance with the information, that a situation has occurred where the specific operation device needs to be operated.

The image data control unit 63 controls image data to be input to the driving unit 45. When the situation determination unit 62 determines that a situation has occurred where a specific operation device needs to be operated, the image data control unit 63 generates first image data for displaying images corresponding to the plurality of operation devices mounted in the automobile 10 in a positional relationship corresponding to the arrangement of the plurality of operation devices and displaying the image corresponding to the specific operation device among the images in an emphasized manner, and inputs the first image data to the driving unit 45.

Specifically, the first image data is data for displaying images corresponding to the accelerator pedal 11, the brake pedal 12, the gearshift 14, the parking brake lever 15, the wiper operation lever, the horn button 16, the hazard button 13, the steering wheel 8, and the driving mode switch button 9 in a positional relationship corresponding to the arrangement of the individual operation devices and displaying the image corresponding to the operation device that needs to be operated among the images in an emphasized manner, for example, by changing the color of the image or blinking the image.

When the situation determination unit 62 does not determine that a situation has occurred where a specific operation device needs to be operated, the image data control unit 63 inputs, to the driving unit 45, second image data for displaying a running speed of the automobile 10, information of route guidance to a destination, and the like.

Figure 4:
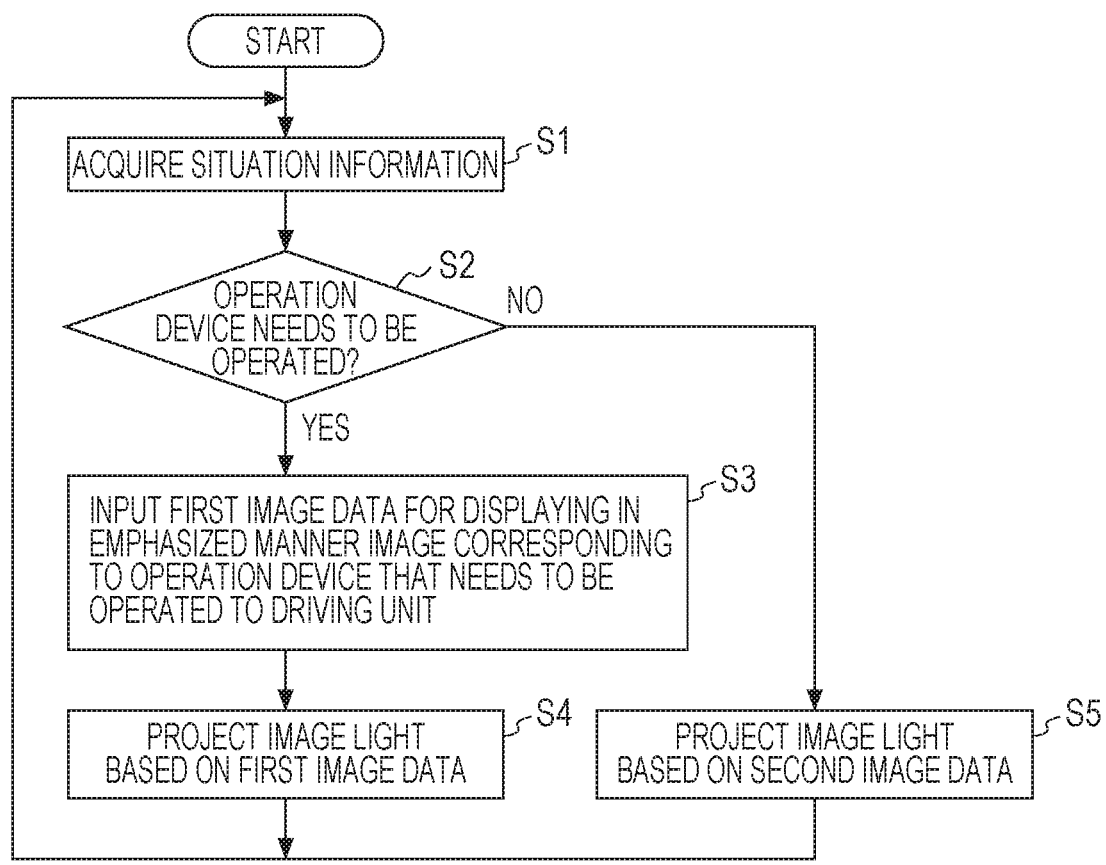
FIG. 4 is a flowchart for describing an operation of the HUD 100 illustrated in FIG. 1.

FIG. 4 is a flowchart for describing an operation of the HUD 100 illustrated in FIG. 1. The process illustrated in FIG. 4 is repeatedly performed while the power of the HUD 100 is in an ON state and the automobile 10 is in the first mode.

First, the situation information acquisition unit 61 acquires situation information (step S1). Subsequently, it is determined, in accordance with the situation information acquired by the situation information acquisition unit 61, whether or not a situation has occurred where an operation device that is mounted in the automobile 10 and used for driving needs to be operated (step S2).

When it is determined that a situation has occurred where an operation device needs to be operated (YES in step S2), the image data control unit 63 generates first image data and inputs the first image data to the driving unit 45 (step S3).

The driving unit 45 drives the light modulation element 44 in accordance with the first image data received from the image data control unit 63, thereby projecting image light that is based on the first image data onto the projection surface 2 (step S4). Accordingly, as illustrated in FIG. 5, an operation assisting image 70 and a driving assisting image 79 are projected onto the projection surface 2, and these images are observed by the driver.

Figure 5:
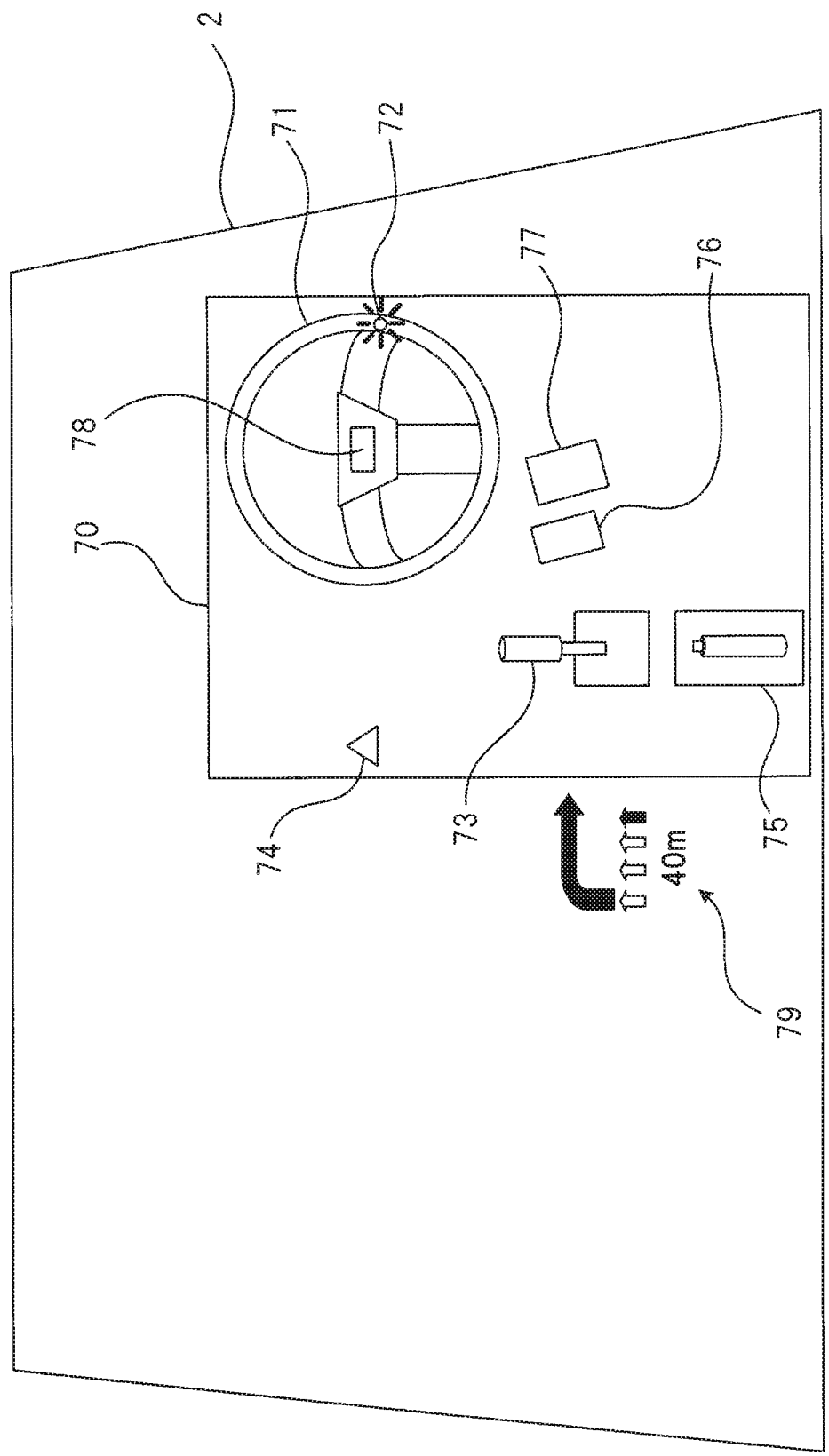
FIG. 5 is a diagram illustrating an example of an image displayed by the HUD 100.

As illustrated in FIG. 5, the operation assisting image 70 includes an image 71 corresponding to the steering wheel 8, an image 72 corresponding to the driving mode switch button 9, an image 73 corresponding to the gearshift 14, an image 74 corresponding to the hazard button 13, an image 75 corresponding to the parking brake lever 15, an image 76 corresponding to the brake pedal 12, an image 77 corresponding to the accelerator pedal 11, and an image 78 corresponding to the horn button 16.

Each of the images 71 to 78 is an image imitating the corresponding operation device, an outline image depicting only the colored outline of the corresponding operation device, a photographed image of the corresponding operation device, an image representing the corresponding operation device by computer graphics (CG), or the like. In the operation assisting image 70, a background portion other than the images 71 to 78 is transparent.

The arrangement positions of the images 71 to 78 in the operation assisting image 70 correspond to the arrangement positions of the individual operation devices in a state where the driver looks forward from the driver's seat in the automobile 10. That is, the outer frame of the operation assisting image 70 represents the field of view when the driver looks forward from the driver's seat, and the images 71 to 78 corresponding to the individual operation devices are arranged in the same relationship as that of the arrangement of the individual operation devices within this field of view. Accordingly, by viewing the operation assisting image 70, the driver is able to intuitively grasp an operation device that needs to be operated.

FIG. 5 illustrates a display example of a case where it is determined that a situation has occurred where the driving mode switch button 9 needs to be operated. The image 72 corresponding to the driving mode switch button 9 is displayed in an emphasized manner by being blinked.

In the example in FIG. 5, the first image data includes data for displaying the driving assisting image 79 for providing route guidance to a destination or the like. Thus, the driver is able to visually recognize the driving assisting image 79 together with the operation assisting image 70. The first image data need not necessarily include the data for displaying the driving assisting image 79.

Figure 6:
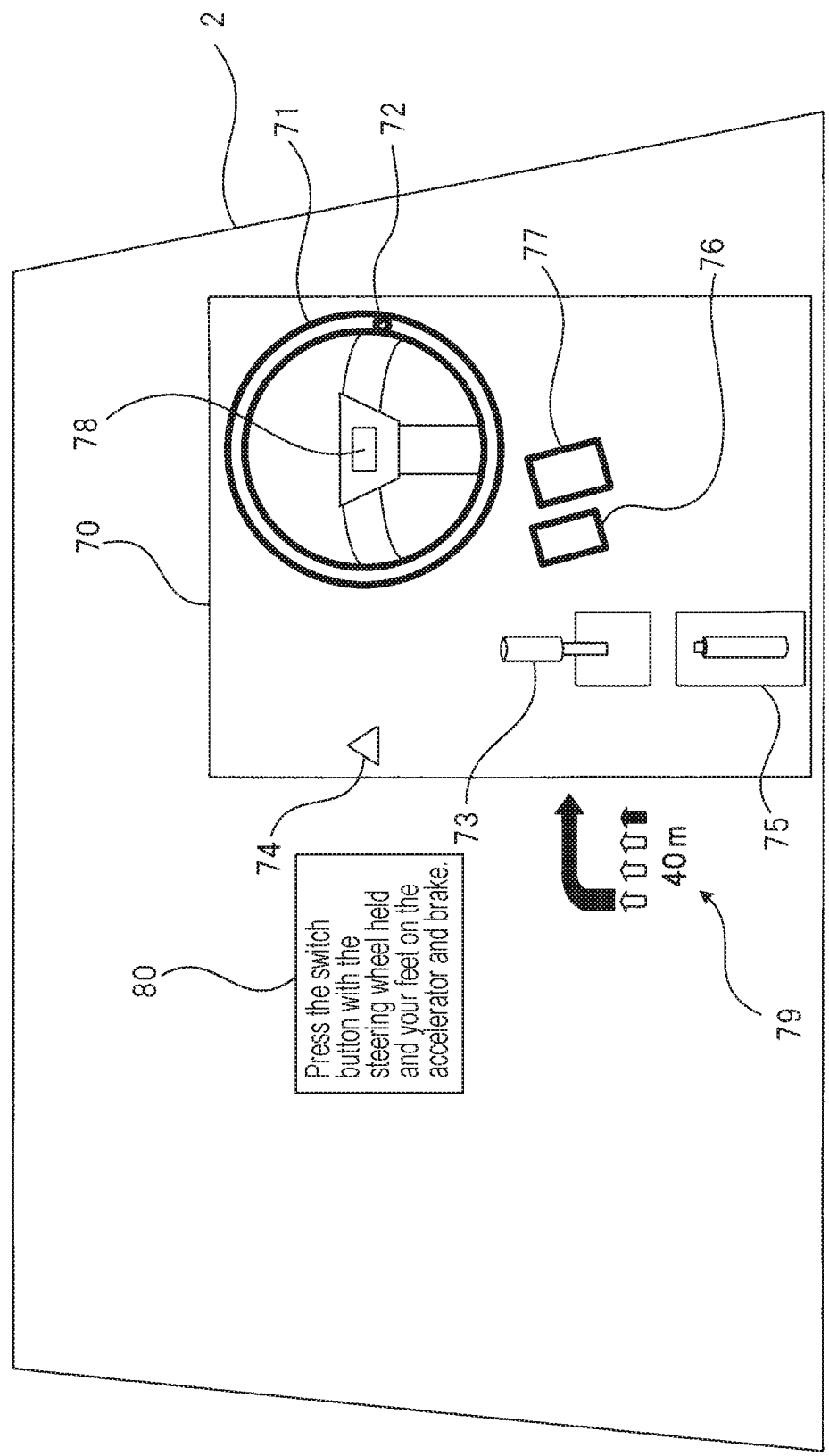
FIG. 6 is a diagram illustrating another example of an image displayed by the HUD 100.

FIG. 6 is a diagram illustrating another display example of the operation assisting image 70 in a case where it is determined that a situation has occurred where the driving mode switch button 9 needs to be operated.

In the example in FIG. 6, the image 71 corresponding to the steering wheel 8, the image 76 corresponding to the brake pedal 12, the image 77 corresponding to the accelerator pedal 11, and the image 72 corresponding to the driving mode switch button 9 in the operation assisting image 70 are displayed in an emphasized manner, with the outlines thereof being changed to bold lines compared with the other images.

In this example, the first image data further includes data for displaying an image 80 depicting the procedure of switching from the first mode to the second mode in text. Thus, the driver further visually recognizes the image 80 depicting the procedure of switching from the first mode to the second mode in text.

When it is determined that an operation device need not be operated (NO in step S2), the image data control unit 63 inputs second image data to the driving unit 45. Subsequently, the driving unit 45 drives the light modulation element 44 in accordance with the second image data received from the image data control unit 63, thereby projecting image light that is based on the second image data onto the projection surface 2 (step S6). Accordingly, only the driving assisting image 79, whose examples are illustrated in FIGS. 5 and 6, is projected onto the projection surface 2. After step S4 and step S5, the process returns to step S1.

The method for emphasizing an arbitrary image in the operation assisting image 70 is not limited to the above-described method. For example, a method for adding emphasis by making the display color of an arbitrary image different from that of the other images, a method for adding emphasis by dynamically changing the size of an arbitrary image (repeating scaling), or the like may be adopted. In the case of adding emphasis by changing the display color, it is preferable that the display color of an arbitrary image is to be set to a color other than the color used to give a warning, such as red or yellow.

As described above, according to the HUD 100, when it is determined, in a state where the automobile 10 is in the first mode, that a situation has occurred where an operation device needs to be operated, the operation assisting image 70 illustrated in FIG. 5 or 6 can be presented to the driver. Thus, as a result of checking an image displayed in an emphasized manner in the operation assisting image 70, the driver is able to intuitively understand an operation that needs to be performed in the current situation and the position of the operation device to be operated. Accordingly, the driver is able to instantaneously take an action suitable for the situation even during automated driving or remote driving. In particular, in a situation where danger is approaching, instantaneous grasping of a necessary operation enables the avoidance of danger at an early stage to increase safety.

When driving of the automobile 10 is being performed in the first mode, there is a possibility that a driver, who is a person seated on the driver's seat, is not looking forward carefully. Thus, in the case of projecting image light that is based on first image data onto the projection surface 2 (when it is determined that a situation has occurred where an operation device needs to be operated), it is preferable that the system control unit 60 of the HUD 100 perform control to guide the line of sight of the driver to the projection surface 2. A method for guiding the line of sight of the driver has the following two examples, but is not limited thereto.

(First Line-of-Sight Guiding Method)

The image data control unit 63 uses, as the first image data to be input to the driving unit 45, image data in which, among light that has been spatially modulated in accordance with individual pieces of pixel data constituting a background portion other than images corresponding to operation devices and light that has been spatially modulated in accordance with individual pieces of pixel data constituting the images corresponding to the operation devices, the light that has been spatially modulated in accordance with the individual pieces of pixel data constituting the background portion reaches at least the projection surface 2.

Figure 7:
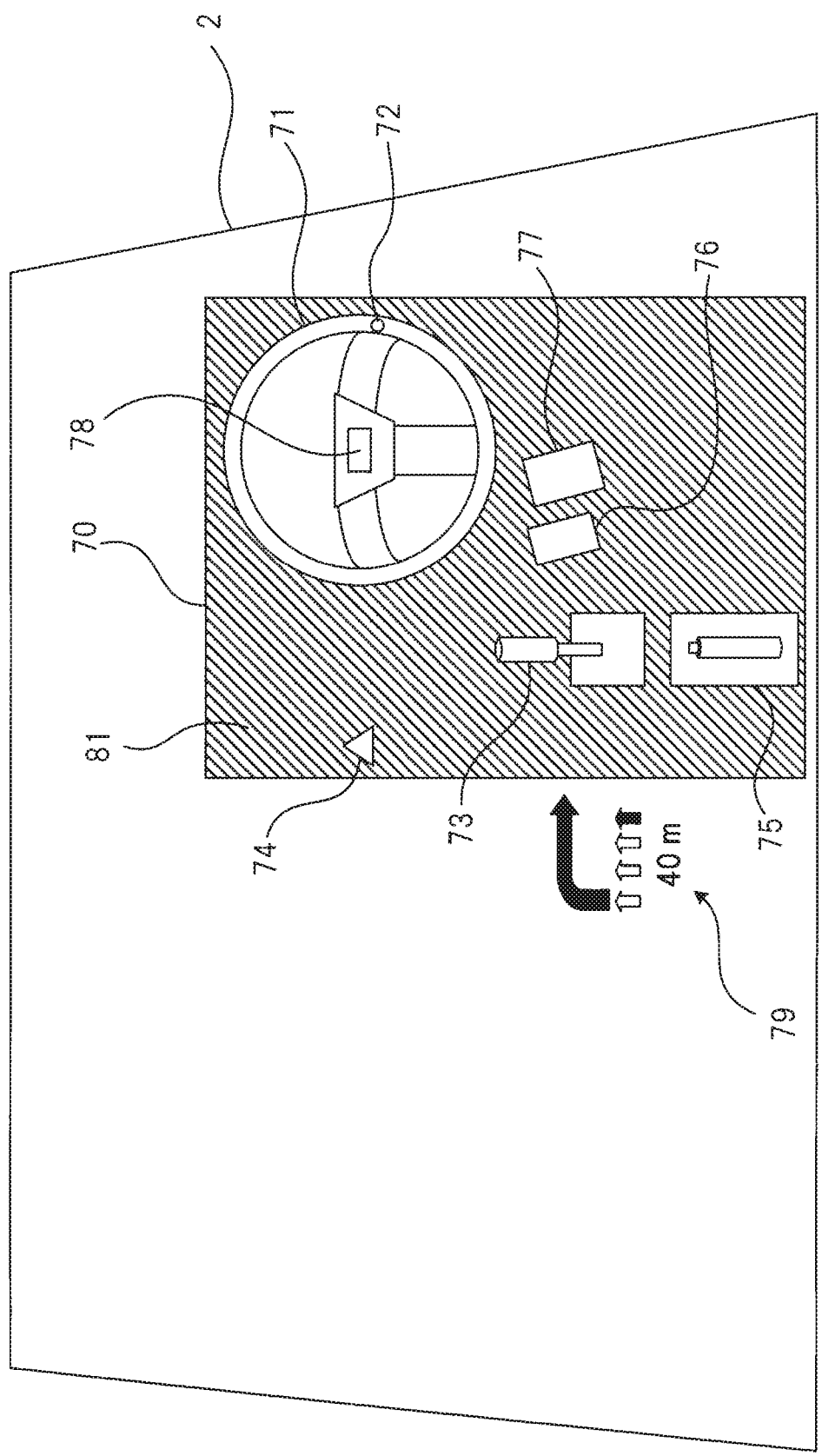
FIG. 7 is a diagram illustrating still another example of an image displayed by the HUD 100.

FIG. 7 is a diagram illustrating a modification example of the operation assisting image 70 that is based on the first image data.

In the operation assisting image 70 illustrated in FIG. 7, the images 71 to 77 have a first color or are transparent, and a background portion 81 other than the images 71 to 77 has a second color different from the first color. In this way, as a result of generating the first image data in which the background portion 81 of the images 71 to 77 is colored, the operation assisting image 70 can be highlighted, and the line of sight of the driver can be guided to the operation assisting image 70.

With this method, control of line-of-sight guiding can be realized at low cost without using a special device.

(Second Line-of-Sight Guiding Method)

The system control unit 60 performs line-of-sight guiding by turning on an ambient light provided on a ceiling surface or wall surface in the automobile 10.

Figure 8:
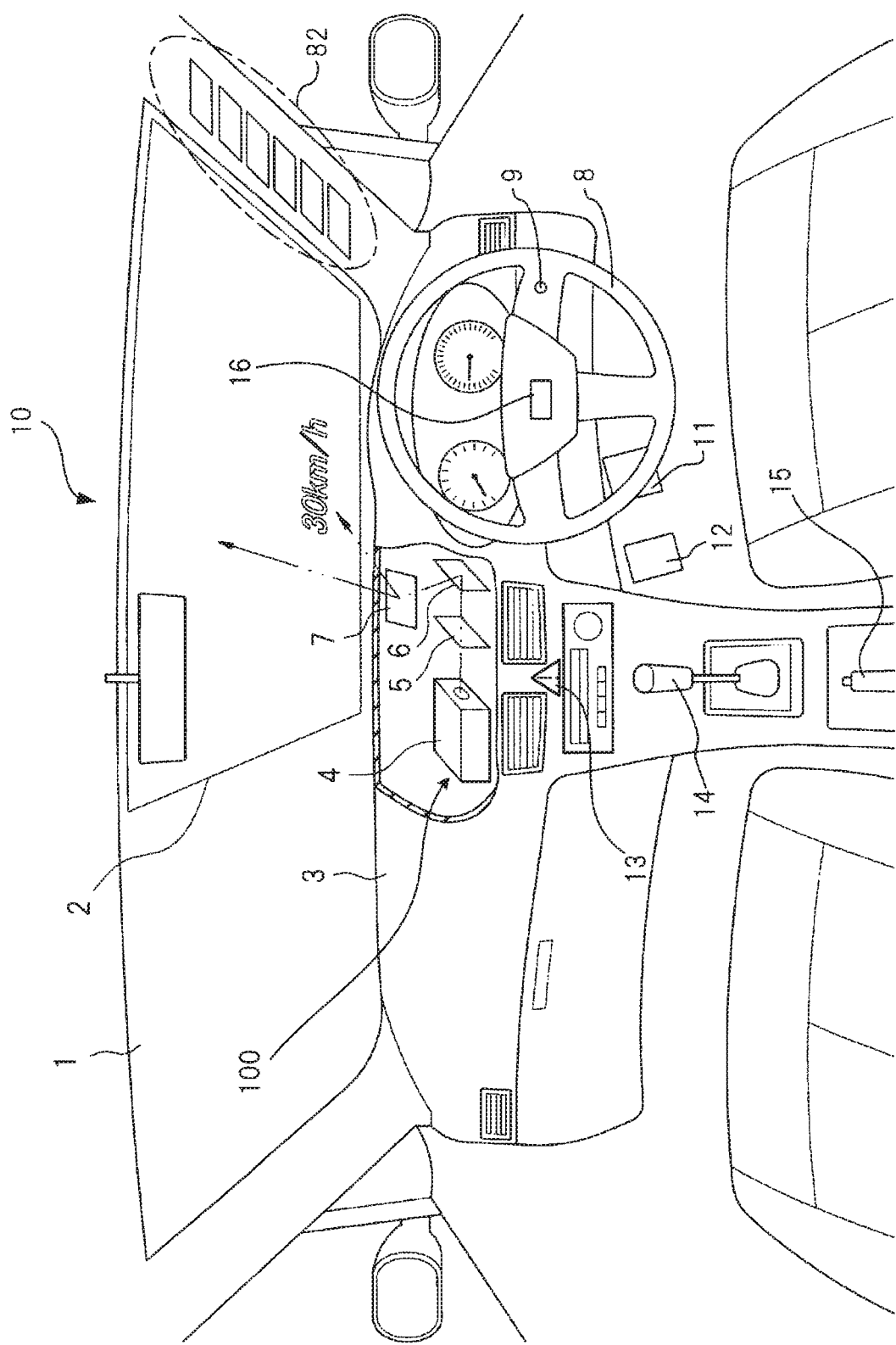
FIG. 8 is a diagram illustrating a modification example of the automobile 10 in which the HUD 100 illustrated in FIG. 1 is mounted.

FIG. 8 is a diagram illustrating a modification example of the automobile 10 in which the HUD 100 illustrated in FIG. 1 is mounted.

As illustrated in FIG. 8, an ambient light 82 formed of LEDs or the like is disposed on a pillar near the driver's seat in the automobile 10. ON/OFF of the ambient light 82 is controlled by the automobile control unit of the automobile 10. The components other than the ambient light 82 are similar to those in FIG. 1.

When the situation determination unit 62 determines that a situation has occurred where an operation device needs to be operated, the system control unit 60 of the HUD 100 outputs, to the automobile control unit, a signal serving as an instruction to turn on the ambient light 82. In response to receipt of this signal, the automobile control unit turns on the ambient light 82.

With the above-described configuration, the ambient light 82 is turned on when a situation occurs where an operation device needs to be operated during automated driving or remote driving. Thus, even when the line of sight of the driver on the driver's seat is not directed forward, the line of sight can be guided to the projection surface 2. This configuration is highly effective for guiding a light of sight, compared to the method of coloring the background of the operation assisting image 70.

In the example in FIG. 8, the ambient light 82 is disposed on the pillar near the driver's seat, but the arrangement of the ambient light 82 is not limited thereto as long as the line of sight of the driver can be guided forward. For example, the ambient light 82 may be disposed on the instrument panel, the dashboard, or the like of the automobile 1.

The first line-of-sight guiding method and the second line-of-sight guiding method may be executed in combination.

A light emitting element, such as an LED, may be fixed to each of the operation devices corresponding to the individual images included in the operation assisting image 70, and the system control unit 60 may perform, when displaying the operation assisting image 70, control to cause the light emitting element fixed to the operation device corresponding to an image to be displayed in an emphasized manner in the operation assisting image 70 to emit light.

For example, in the case of displaying the operation assisting image 70 illustrated in FIG. 5, the system control unit 60 turns on the light emitting element fixed to the driving mode switch button 9. With this configuration, it is possible to notify the driver of the position of the operation device that needs to be operated by turning on the light emitting element. Thus, it is possible to more reliably present the position of the operation device that needs to be operated to the driver, and an wrong operation can be prevented.

In the foregoing embodiment, the accelerator pedal 11, the brake pedal 12, the gearshift 14, the parking brake lever 15, the wiper operation lever, the horn button 16, the hazard button 13, the steering wheel 8, and the driving mode switch button 9 are mounted in the automobile 10 as operation devices used for driving.

The operation devices for which the situation determination unit 62 determines the necessity/non-necessity of the operation may be two or more of these operation devices. Preferably, the accelerator pedal 11, the brake pedal 12, the steering wheel 8, and the driving mode switch button 9 that are necessary to avoid dangers are the targets for which necessity/non-necessity of the operation is determined.

As described above, this specification discloses the followings.

(1) A projection display device mounted in a vehicle, the vehicle being settable to a first mode in which driving is performed in accordance with an internally generated instruction or an externally and wirelessly received instruction, the projection display device including: a light modulation unit that spatially modulates, in accordance with image data that has been input, light emitted by a light source; a projection optical system that projects the light that has been spatially modulated onto a projection surface of the vehicle to display a virtual image or real image that is based on the image data; an image data control unit that controls image data to be input to the light modulation unit; and a situation determination unit that determines, in a state where the first mode is set, whether or not a situation has occurred where at least one operation device among a plurality of operation devices mounted in the vehicle and used for driving needs to be operated, wherein when the situation determination unit determines that the situation has occurred where the at least one operation device needs to be operated, the image data control unit inputs, to the light modulation unit, first image data for displaying images corresponding to the plurality of operation devices in a positional relationship corresponding to an arrangement of the plurality of operation devices and displaying, in an emphasized manner, the image corresponding to the at least one operation device that needs to be operated.

(2) The projection display device described in (1), wherein when the situation determination unit determines that the situation has occurred where the at least one operation device needs to be operated, the image data control unit performs control to guide a line of sight of a person on a driver's seat of the vehicle to the projection surface.

(3) The projection display device described in (2), wherein the image data control unit performs the control to guide the line of sight of the person to the projection surface by using, as the first image data to be input to the light modulation unit, image data in which, among the light that has been spatially modulated in accordance with individual pieces of pixel data constituting a background portion other than the images and the light that has been spatially modulated in accordance with individual pieces of pixel data constituting the images, the light that has been spatially modulated in accordance with the individual pieces of pixel data constituting the background portion reaches at least the projection surface.

(4) The projection display device described in any one of (1) to (3), wherein the vehicle is further settable to a second mode in which a person drives manually, the plurality of operation devices include a mode switching instruction device for providing an instruction to switch between the first mode and the second mode, and when the situation is a situation where the mode switching instruction device needs to be operated, the image data control unit inputs, to the light modulation unit, the first image data for displaying, in an emphasized manner, the image corresponding to the mode switching instruction device.

(5) The projection display device described in any one of (1) to (4), wherein a light emitting element is fixed to each of the plurality of operation devices, and in a state where the first mode is set, the light emitting element fixed to the at least one operation device corresponding to the emphasized image is in an ON state.

(6) A control method for a projection display device mounted in a vehicle and having a light modulation unit that spatially modulates, in accordance with image data that has been input, light emitted by a light source, and a projection optical system that projects the light that has been spatially modulated onto a projection surface of the vehicle to display a virtual image or real image that is based on the image data, the vehicle being settable to a first mode in which driving is performed in accordance with an internally generated instruction or an externally and wirelessly received instruction, the control method including: an image data control step of controlling image data to be input to the light modulation unit; and a situation determination step of determining, in a state where the first mode is set, whether or not a situation has occurred where at least one operation device among a plurality of operation devices mounted in the vehicle and used for driving needs to be operated, wherein when the situation determination step determines that the situation has occurred where the at least one operation device needs to be operated, the image data control step inputs, to the light modulation unit, first image data for displaying images corresponding to the plurality of operation devices in a positional relationship corresponding to an arrangement of the plurality of operation devices and displaying, in an emphasized manner, the image corresponding to the at least one operation device that needs to be operated.

(7) The control method for the projection display device described in (6), wherein when the situation determination step determines that the situation has occurred where the at least one operation device needs to be operated, the image data control step performs control to guide a line of sight of a person on a driver's seat of the vehicle to the projection surface.

(8) The control method for the projection display device described in (7), wherein the image data control step guides the line of sight of the person to the projection surface by using, as the first image data to be input to the light modulation unit, image data in which, among the light that has been spatially modulated in accordance with individual pieces of pixel data constituting a background portion other than the images and the light that has been spatially modulated in accordance with individual pieces of pixel data constituting the images, the light that has been spatially modulated in accordance with the individual pieces of pixel data constituting the background portion reaches at least the projection surface.

(9) The control method for the projection display device described in any one of (6) to (8), wherein the vehicle is further settable to a second mode in which a person drives manually, the plurality of operation devices include a mode switching instruction device for providing an instruction to switch between the first mode and the second mode, and when the situation is a situation where the mode switching instruction device needs to be operated, the image data control step inputs, to the light modulation unit, the first image data for displaying, in an emphasized manner, the image corresponding to the mode switching instruction device.

The present invention is highly convenient and effective for use particularly in an automobile.

REFERENCE SIGNS LIST

100 HUD
1 front windshield
2 projection surface
3 dashboard
4 control unit
5 diffusion member
6 reflection mirror
7 concave mirror
8 steering wheel
9 driving mode switch button
10 automobile
11 accelerator pedal
12 brake pedal
13 hazard button
14 gearshift
15 parking brake lever
16 horn button
40 light source unit
40A light source control unit
41r R light source
41g G light source
41b B light source
42r, 42g, 42b collimator lens
43 dichroic prism
44 light modulation element
45 driving unit
60 system control unit
61 situation information acquisition unit
62 situation determination unit
63 image data control unit
70 operation assisting image
71 image corresponding to steering wheel
72 image corresponding to driving mode switch button
73 image corresponding to gearshift
74 image corresponding to hazard button
75 image corresponding to parking brake button
76 image corresponding to brake pedal
77 image corresponding to accelerator pedal
78 image corresponding to horn button
79 driving assisting image
80 image depicting procedure of switching driving mode
81 background portion
82 ambient light

What is claimed is:

1. A projection display device mounted in a vehicle,
the vehicle being settable to a first mode in which driving is performed in accordance with an internally generated instruction from an automobile control unit or an externally and wirelessly received instruction from the automobile control unit, wherein the first mode is an automated driving mode and the projection display device comprises:
a light modulation unit that spatially modulates, in accordance with image data that has been input, light emitted by a light source;
a projection optical system that projects the light that has been spatially modulated onto a projection surface of the vehicle to display a virtual image or real image that is based on the image data;
an image data control unit that controls image data to be input to the light modulation unit; and
a situation determination unit that determines, in a state where the first mode is set, whether or not a situation has occurred where at least one operation device among a plurality of operation devices mounted in the vehicle and used for driving needs to be operated by analyzing information measured by a sensor, wherein
when the situation determination unit determines that the situation has occurred where the at least one operation device needs to be operated, the image data control unit inputs, to the light modulation unit, first image data for displaying images corresponding to the plurality of operation devices in a positional relationship corresponding to an arrangement of the plurality of operation devices and displaying, in an emphasized manner, the image corresponding to the at least one operation device that needs to be operated,
wherein the vehicle is further settable to a second mode in which a person drives manually, the plurality of operation devices include a mode switching instruction device for providing an instruction to switch between the first mode and the second mode, and when the situation is a situation where the mode switching instruction device needs to be operated, the image data control unit inputs, to the light modulation unit, the first image data for displaying, in an emphasized manner, the image corresponding to the mode switching instruction device,
wherein when the situation determination unit detects a failure of the sensor, the first mode is switched to the second mode by the instruction provided by the mode switching instruction device.

2. The projection display device according to claim 1, wherein
when the situation determination unit determines that the situation has occurred where the at least one operation device needs to be operated, the image data control unit performs control to guide a line of sight of a person on a driver's seat of the vehicle to the projection surface.

3. The projection display device according to claim 2, wherein
the image data control unit performs the control to guide the line of sight of the person to the projection surface by using, as the first image data to be input to the light modulation unit, image data in which, among the light that has been spatially modulated in accordance with individual pieces of pixel data constituting a background portion other than the images and the light that has been spatially modulated in accordance with individual pieces of pixel data constituting the images, the light that has been spatially modulated in accordance with the individual pieces of pixel data constituting the background portion reaches at least the projection surface.

4. The projection display device according to claim 3, wherein
   a light emitting element is fixed to each of the plurality of operation devices, and
   in a state where the first mode is set, the light emitting element fixed to the at least one operation device corresponding to the emphasized image is in an ON state.

5. The projection display device according to claim 2, wherein
   a light emitting element is fixed to each of the plurality of operation devices, and
   in a state where the first mode is set, the light emitting element fixed to the at least one operation device corresponding to the emphasized image is in an ON state.

6. The projection display device according to claim 1, wherein
   a light emitting element is fixed to each of the plurality of operation devices, and
   in a state where the first mode is set, the light emitting element fixed to the at least one operation device corresponding to the emphasized image is in an ON state.

7. The projection display device according to claim 1, wherein
   a light emitting element is fixed to each of the plurality of operation devices, and
   in a state where the first mode is set, the light emitting element fixed to the at least one operation device corresponding to the emphasized image is in an ON state.

8. A control method for a projection display device mounted in a vehicle and having a light modulation unit that spatially modulates, in accordance with image data that has been input, light emitted by a light source, and a projection optical system that projects the light that has been spatially modulated onto a projection surface of the vehicle to display a virtual image or real image that is based on the image data,
   the vehicle being settable to a first mode in which driving is performed in accordance with an internally generated instruction from an automobile control unit or an externally and wirelessly received instruction from the automobile control unit, wherein the first mode is an automated driving mode, and
   the control method comprises:
   an image data control step of controlling image data to be input to the light modulation unit; and
   a situation determination step of determining, in a state where the first mode is set, whether or not a situation has occurred where at least one operation device among a plurality of operation devices mounted in the vehicle and used for driving needs to be operated by analyzing information measured by a sensor, wherein
   when the situation determination step determines that the situation has occurred where the at least one operation device needs to be operated, the image data control step inputs, to the light modulation unit, first image data for displaying images corresponding to the plurality of operation devices in a positional relationship corresponding to an arrangement of the plurality of operation devices and displaying, in an emphasized manner, the image corresponding to the at least one operation device that needs to be operated,
   wherein the vehicle is further settable to a second mode in which a person drives manually, the plurality of operation devices include a mode switching instruction device for providing an instruction to switch between the first mode and the second mode, and when the situation is a situation where the mode switching instruction device needs to be operated, the image data control unit inputs, to the light modulation unit, the first image data for displaying, in an emphasized manner, the image corresponding to the mode switching instruction device,
   wherein when the situation determination unit detects a failure of the sensor, the first mode is switched to the second mode by the instruction provided by the mode switching instruction device.

9. The control method for the projection display device according to claim 8, wherein
   when the situation determination step determines that the situation has occurred where the at least one operation device needs to be operated, the image data control step performs control to guide a line of sight of a person on a driver's seat of the vehicle to the projection surface.

10. The control method for the projection display device according to claim 9, wherein
    the image data control step guides the line of sight of the person to the projection surface by using, as the first image data to be input to the light modulation unit, image data in which, among the light that has been spatially modulated in accordance with individual pieces of pixel data constituting a background portion other than the images and the light that has been spatially modulated in accordance with individual pieces of pixel data constituting the images, the light that has been spatially modulated in accordance with the individual pieces of pixel data constituting the background portion reaches at least the projection surface.

* * * * *